(12) United States Patent
Hofer et al.

(10) Patent No.: US 12,391,058 B2
(45) Date of Patent: Aug. 19, 2025

(54) SECURITY ELEMENT HAVING TILT-DEPENDENT MOTIF DEPICTION AND METHOD FOR PRODUCTION THEREOF

(71) Applicant: GIESECKE+DEVRIENT CURRENCY TECHNOLOGY GMBH, Munich (DE)

(72) Inventors: Moritz Hofer, Munich (DE); Raphael Dehmel, Neubeuern (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 447 days.

(21) Appl. No.: 17/778,986

(22) PCT Filed: Nov. 26, 2020

(86) PCT No.: PCT/EP2020/025540
§ 371 (c)(1),
(2) Date: May 23, 2022

(87) PCT Pub. No.: WO2021/104674
PCT Pub. Date: Jun. 3, 2021

(65) Prior Publication Data
US 2022/0410611 A1 Dec. 29, 2022

(30) Foreign Application Priority Data
Nov. 27, 2019 (DE) ............... 10 2019 008 250.8

(51) Int. Cl.
*B42D 25/324* (2014.01)
*B42D 25/328* (2014.01)
(Continued)

(52) U.S. Cl.
CPC ......... *B42D 25/324* (2014.10); *B42D 25/328* (2014.10); *G02B 3/0056* (2013.01);
(Continued)

(58) Field of Classification Search
CPC .................................................. B42D 25/324
See application file for complete search history.

(56) References Cited

U.S. PATENT DOCUMENTS 5,199,744 A 4/1993 Shenton
7,002,746 B2 2/2006 Schilling et al.
(Continued)

FOREIGN PATENT DOCUMENTS

DE 10216561 A1 10/2003
DE 102007039591 A1 2/2009
(Continued)

OTHER PUBLICATIONS

Germany Search Report from corresponding DE Application No. 102019008250.8, Aug. 11, 2020.
(Continued)

*Primary Examiner* — Kyle R Grabowski
(74) *Attorney, Agent, or Firm* — Workman Nydegger

(57) ABSTRACT

A security element for manufacturing value documents has a structure including first and second motifs which change their appearance when the security element is tilted over a tilting angle range. The structure has first micro-elements, which are arranged with a first pattern and a first motif, and second micro-elements, which are arranged with a second pattern and a second motif. The first and second patterns are nested within each other on an areal region of the security element and have different visual appearances according to the tilting of the securing element.

10 Claims, 5 Drawing Sheets

(51) Int. Cl.
*G02B 3/00* (2006.01)
*G02B 5/18* (2006.01)
*G02B 17/00* (2006.01)
*B42D 25/29* (2014.01)
*B42D 25/373* (2014.01)
*B42D 25/378* (2014.01)

(52) U.S. Cl.
CPC ......... *G02B 5/1819* (2013.01); *G02B 17/002* (2013.01); *B42D 25/29* (2014.10); *B42D 25/373* (2014.10); *B42D 25/378* (2014.10)

(56) References Cited

U.S. PATENT DOCUMENTS

| | | | |
|---|---|---|---|
| 8,526,085 | B2 | 9/2013 | Dichtl et al. |
| 10,029,506 | B2 | 7/2018 | Fuhse |
| 10,081,213 | B2 | 9/2018 | Fuhse |
| 10,639,925 | B2 | 5/2020 | Fuhse |
| 10,744,812 | B2 | 8/2020 | Hovestadt |
| 2005/0163922 | A1 | 7/2005 | Schilling et al. |
| 2008/0037131 | A1 | 2/2008 | Steenblik et al. |
| 2008/0258456 | A1* | 10/2008 | Rahm ................ B42D 25/29 283/85 |
| 2011/0069360 | A1 | 3/2011 | Dichtl et al. |
| 2015/0258838 | A1 | 9/2015 | Fuhse |
| 2018/0117947 | A1 | 5/2018 | Fuhse |
| 2018/0117949 | A1 | 5/2018 | Fuhse |
| 2020/0122499 | A1 | 4/2020 | Hovestadt |

FOREIGN PATENT DOCUMENTS

| | | |
|---|---|---|
| DE | 102017004586 A1 | 11/2018 |
| DE | 102018004062 A1 | 11/2019 |
| EP | 2123470 A1 | 11/2009 |
| GB | 2572550 A | 10/2019 |
| WO | 2005106601 A2 | 11/2005 |
| WO | 2008008635 A2 | 1/2008 |
| WO | 2009017824 A2 | 2/2009 |
| WO | 2012048847 A1 | 4/2012 |
| WO | 2014060089 A2 | 4/2014 |
| WO | 2016177470 A1 | 11/2016 |
| WO | 2016180522 A1 | 11/2016 |
| WO | 2017184581 A1 | 10/2017 |
| WO | 2018206147 A1 | 11/2018 |
| WO | 2018219498 A1 | 12/2018 |
| WO | 2019077419 A1 | 4/2019 |

OTHER PUBLICATIONS

International Search Report from PCT Application No. PCT/EP2020/025540, Feb. 15, 2021.

* cited by examiner

SECURITY ELEMENT HAVING TILT-DEPENDENT MOTIF DEPICTION AND METHOD FOR PRODUCTION THEREOF

BACKGROUND

The invention relates to a security element for manufacturing value documents, such as banknotes, checks or the like, which has a structure that presents a first and a second motif, which change their appearance when the security element is tilted over a tilting angle range, wherein the structure has first micro-elements, which are arranged according to a first pattern and present the first motif, and second micro-elements, which are arranged according to a second pattern and present the second motif, and the first and the second pattern are nested within each other on an areal region of the security element.

The invention further relates to a method for manufacturing a security element for value documents, such as banknotes, checks or the like, wherein the method has the steps of: producing a structure on a substrate that presents a first and a second motif, which change their appearance when the security element is tilted over a tilting angle range, wherein the structure has first micro-elements, which are arranged according to a first pattern and present the first motif, and second micro-elements, which are arranged according to a second pattern and present the second motif, and the first and the second pattern are nested within each other on an areal section of the security element.

Such a generic security element and such a generic manufacturing method are known from WO 2018/206147 A1.

The representation of achromatic motifs on the basis of micromirrors is known from DE 102017004586 A1 or WO 2012/048847 A1. Further security elements, some of which employ micromirrors, can be found in WO 2016/177470 A1, WO 2009/017824 A2, WO 2016/180522 A1 and WO 2014/060089 A2.

In the generic security element, it is possible to arrange the micro-elements—formed as micro-mirrors in the generic state of the art—in such a manner that two motifs are visible only from a specific viewing angle onto the banknote and change when the banknote is tilted, for example switch from one motif to another. In the case of micromirrors, for example, such a motif switch is achieved in that the mirror gradient along the perpendicular to the tilting axis has only positive values in one section and only negative values in another section. This approach results in both motifs being visible at the same time and spatially superimposed in a middle view, usually when viewed perpendicularly, i.e. with the security element not tilted. In the generic state of the art, this is utilized for additional effects. However, since the viewer cannot separate the two motifs in a perpendicular plan view, as is very often adopted, this often leads to an optically unappealing impression. In addition, untrained viewers who only see the security element from a small angle range may not even notice that a motif switch would occur upon tilting, because there is no indication that tilting could reveal new information.

SUMMARY

In view of this, it is the object of the invention to make available a security element that is easier to recognize and thus ultimately more forgery-proof, and to specify a corresponding manufacturing method.

A security element is provided for manufacturing value documents, such as banknotes, checks or the like. It has a structure that presents a first and a second motif. When the security element is tilted over a tilting angle range, the motifs change their appearance. The structure comprises first micro-elements and second micro-elements, which are arranged according to a first or second pattern. The first micro-elements present the first motif; the second micro-elements present the second motif. The motifs appear in an areal region in which the first and the second pattern on the security element are nested within each other. When the security element is tilted, a change of the appearance of the motifs takes place. The micro-elements are formed accordingly for this purpose. The first micro-elements present the first motif in such a manner that it is visible in its entirety in the areal region within the tilting angle range of a specific start tilt position. In particular, it fills the entire areal region. When the tilt position is changed, the portion of the areal region in which the first motif is visible decreases as the tilt increases. Upon reaching a certain end tilt position, the motif is no longer visible at all. The second micro-elements are configured to complement this with regard to the representation of the second motif. They present the second motif in the remaining rest, which remains in relation to the portion of the first areal region in which the first micro-elements, upon tilting, display the first motif. This remaining rest of the areal region shows the second motif due to the effect of the second micro-elements. The second motif is thus not visible at all at the start tilt position, since in this state of the first micro-elements the produced first motif occupies the entire areal region. As the tilt increases, the portion in which the first micro-elements present the first motif becomes smaller, and the rest, in which the second micro-elements present the second motif, grows by an inverse degree. At the end tilt position, the second motif then appears in its entirety in the areal region.

Instead of a global assignment of a tilting angle range for each of the two motifs, spatial sub-regions of the motifs each have their own angle ranges. Upon tilting, the switch between the two motifs takes place in a kind of overlay, in which the portion in which the first motif is visible becomes smaller and smaller and the rest of the areal region, in which the second motif is visible, grows accordingly. The two motifs are thus never represented as superimposed, but rather their share of the areal region grows or shrinks depending on the tilt position. An untrained viewer can thus clearly recognize in the middle position that the security element makes available two motifs, because in the tilt position the viewer usually sees part of the first motif and also the second motif in the remaining rest of the areal region—however without the two motifs being superimposed.

Of course, this effect is particularly prominent and clearly visible when only the assigned section of the respective motif is visible in the respective portion of the areal region. This gives the impression that the one motif is being cut off more and more as the tilt increases, whereas the other motif to the same degree is becoming more and more complete with the tilting. The changes in the motifs therefore preferably do not involve an enlargement or reduction of the motifs but depending on the tilt position only those sections of the motif are visible that are assigned to the remaining portion or rest of the areal region—of course with reference to the complete motif, which is completely visible at the end tilt position or the start tilt position.

The security element implements a continuous and at the same time easily recognizable and understandable transition between the two motifs upon tilting. It is possible that neither one of the motifs is visible in an edge strip with which the rest of the areal region borders on the portion of the areal region. The motifs that displace each other or recede from each other upon tilting are thus separated from each other by a kind of "neutral zone", which makes the motif switch particularly distinctive.

The two motifs particularly preferably have different colors. On the one hand, this makes the effect particularly distinctive and, on the other hand, eliminates a problem that existed in the state of the art when switching between motifs with different colors: there, the superimposition of the two differently colored motifs in the middle view led to a particularly unattractive impression or to difficulty perceiving the individual motifs.

The boundary along which one motif recedes and the other motif grows when the security element is tilted can be a moving straight line, for example a linearly moving line or a line moving in rotating manner. It is equally possible for the motifs to be delimited from one another by a closed curve becoming larger or smaller, in particular by a circle. This implements a kind of pump transition.

As provided in the state of the art of the generic type, the micro-elements can be implemented by micro-mirrors. With advantage the micro-mirrors of the first and/or the micro-mirrors of the second micro-elements are supplied with an ink coating that produces a color impression.

The ink coatings of the micromirrors are formed by glazing inks in advantageous configurations. Metallizations, for example of aluminum, silver or an alloy, such as copper and aluminum, also come into question, as do thin-film structures, in particular color-shifting thin-film structures, gold-blue or silicon-aluminum thin films. The ink coatings can also be formed by glazing inks backed with a metallic mirror coating, for example of aluminum. The ink coatings can represent a glazing image of several glazing inks, which is backed with a mirror coating, for example of aluminum. Luminescent inks, in particular fluorescent inks with a metallic mirror coating, are also conceivable as ink coatings. The ink coatings can also be formed by structural inks, in particular by nano and binary structures, which are embossed onto or into the micromirrors. Finally, nanoparticle inks are also conceivable as ink coatings, such as gold-blue particles, various effect pigments, color-shifting pigments or supersilver. The ink coatings are preferably applied directly to the micromirrors and follow their relief profile.

Likewise, the micro-elements can also be realized by a combination of micro-images and micro-lenses or by diffractive micro-structures or special pigments that can be magnetically aligned. Combinations are possible.

For the manufacture of the security element, embossing methods come into question, such as are disclosed in the cited state of the art for micromirror structures.

The invention further comprises a value document, in particular a security substrate, which has a security element of the type stated.

BRIEF DESCRIPTION OF THE DRAWINGS

The invention is explained in more detail below with the aid of embodiment examples with reference to the attached drawings, which likewise disclose features that are essential to the invention. These embodiment examples are merely illustrative and are not to be interpreted as restrictive. For example, a description of an embodiment example with a multiplicity of elements or components should not be interpreted to mean that all of these elements or components are necessary for implementation. Rather, other embodiment examples can also contain alternative elements and components, fewer elements or components or additional elements or components. Elements or components of different embodiment examples can be combined with one another, unless stated otherwise. Modifications and variations, which are described for one of the embodiment examples, can also be applicable to other embodiment examples. To avoid repetitions, the same or mutually corresponding elements in different figures are identified by the same reference numerals and are not explained several times. In the figures there are shown.

DETAILED DESCRIPTION OF VARIOUS EMBODIMENTS

Figure 1:
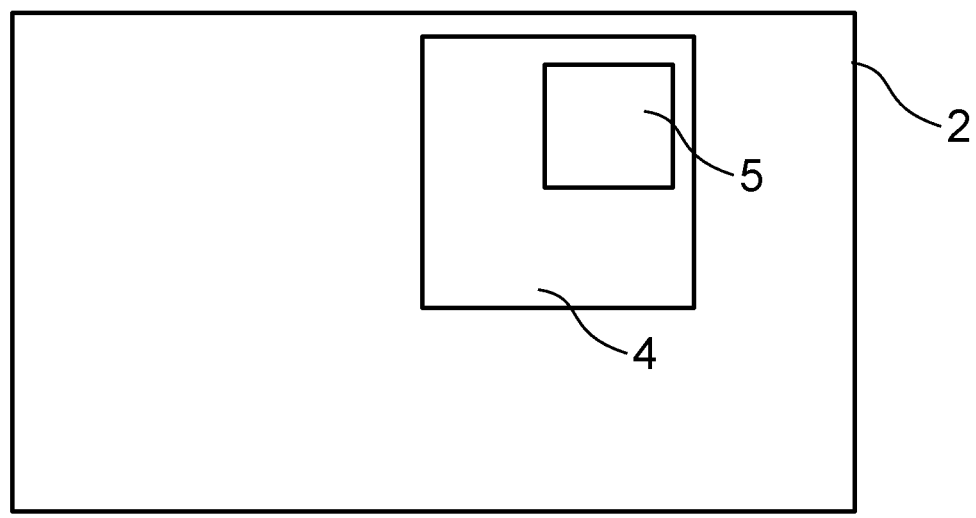
FIG. 1 a plan view of a banknote.

FIG. 1 shows a plan view of a banknote 2 or a preliminary stage of such a banknote that is not yet fit for circulation. The banknote comprises a security element 4 which has a microstructure showing two motifs on an areal region 5. The appearance of the motifs depends on the tilting angle by which the security element is tilted when viewed. As usual, the term tilting refers to a tilting between the substantially flat security element 4 and the viewing direction from which a viewer looks at the security element. This relative position can be achieved by tilting the security element when the viewing direction is fixed or by changing the viewing angle when the security element is fixed. Combinations are of course possible. For the sake of simplicity, a tilting of the security element is assumed below.

Figure 2:
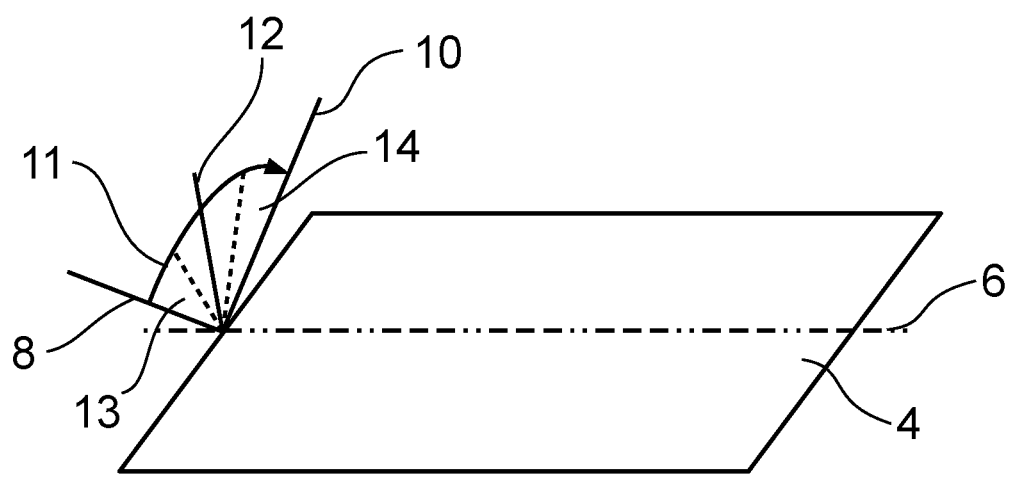
FIG. 2 a schematic representation for explaining tilting angles when viewing a security element of the banknote, FIG. 3 a schematic representation for explaining the structure of an areal region of the security element of FIGS. 1 and 2, FIG. 4A-4F various representations of a first and a second motif occurring at different tilting angles of the security element of FIGS. 1-3, and FIG. 5-8 schematic representations for different embodiments with regard to a motif switch in the security element of FIGS. 1-3.
Figure 3:
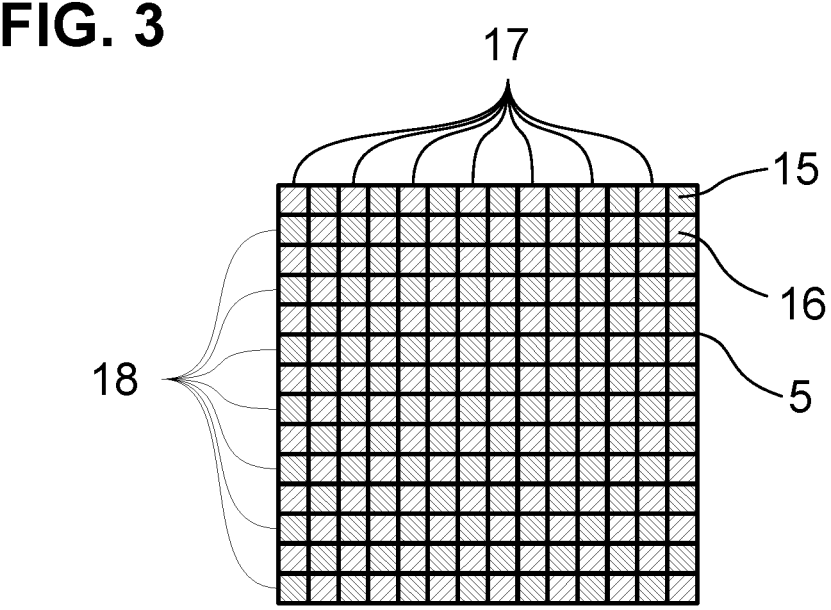
Figure 4A:
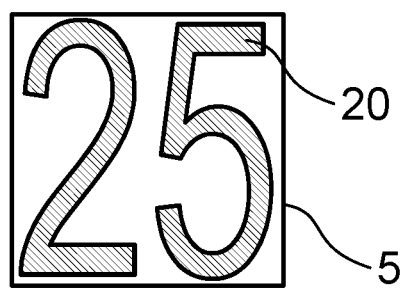

FIG. 2 shows that reference is made to tilting about a tilting axis 6. The tilting considered here runs from a start tilt position 8 to an end tilt position 10 through a tilting angle range 11. A current tilt position 12 is therefore situated between the start tilt position 8 and the end tilt position 10. In extreme cases, these start and/or end positions are situated parallel to the surface of the security element 4. In FIG. 2 it can further be seen that there is a first zone 13 beginning with the start tilt position 8 and a second zone 14 ending with the end tilt position 10. These zones are explained in more detail below with the aid of FIGS. 4A and 4B.

The areal region 5 of the security element 4 has a multiplicity of first micro-elements 15 and second micro-elements 16 which are arranged to be nested within each other in a first pattern 17 (first micro-elements 15) and a second pattern 18 (second micro-elements 16). Such an arrangement and configuration of micro-elements is known from the state of the art, for example from WO 2018/206147 A1 or WO 2014/060089 A2. The micro-elements ensure that a first motif 20 (cf. FIG. 4A) and/or a second motif 22 (cf. FIG. 4B) is presented. The first micro-elements 15 present only the first motif 20, the second micro-elements 16 present only the second motif 22. The first micro-elements 15 are formed in such a manner that the complete first motif 20 is only visible in the first zone 13 of the tilt-angle range 11. The same applies to the second motif 22, the second micro-elements 16 and the second zone 14. The second motif 22 is visible in its entirety only in this zone. In the respective zone 8, 10 only exactly the assigned motif 20, 22 is visible, but not the other one.

Figure 4B:
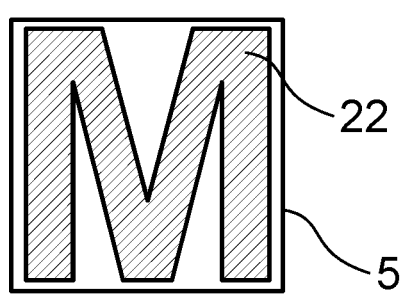

When tilting is now started at the start tilt position 8, only the first motif 20 is visible at first (cf. FIG. 4A), which is presented by the first micro-elements. When the tilt position 12 is guided out of the first zone 13, the first motif 20 begins to disappear from the bottom in the areal region 5 and is replaced by the portion of the second motif 22 situated in this area. The first motif 20 is thus only visible in a portion 24 of the areal region 5; the second motif 22 appears in the rest 26 which remains of the areal region 5 (FIGS. 4C, 4D).

The motifs 20, 22 preferably do not change their size, but rather in the portion 24 or the rest 26 only those sections of the respective motifs 20, 22 are visible that are assigned to these sections of the areal region. When the tilt position 12 is changed further, this process increases. FIG. 4E shows approximately the middle view in a perpendicular plan view. Here the portion 24, in which the first motif 20 can still be partially seen, constitutes the upper half of the areal region 5, the rest 26, in which the corresponding portion of the second motif 22 can be recognized, constitutes approximately the lower half. With yet further tilting (FIG. 4F) the rest 26 occupied by the second motif 22 grows and the portion 24 in which the remains of the first motif 20 can be seen decreases more and more until the tilt position 12 reaches the second zone 14, in which exclusively the second motif 22 can be seen in the areal region 5 (FIG. 4B). In this manner, an overlay between the first 20 and the second motif 22 takes place.

Figure 4C:
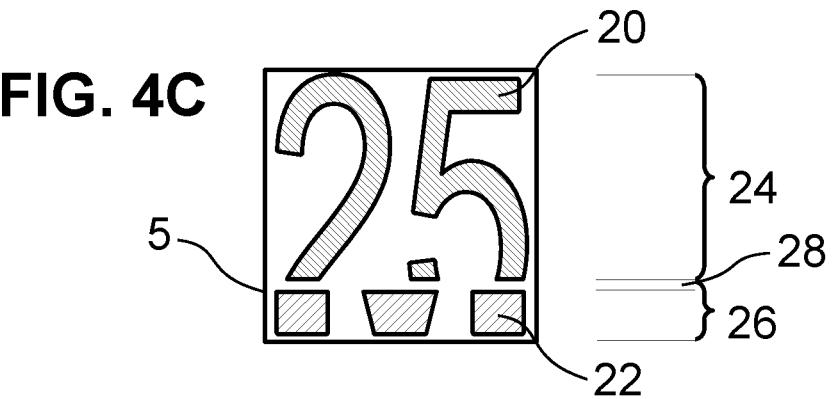
Figure 4D:
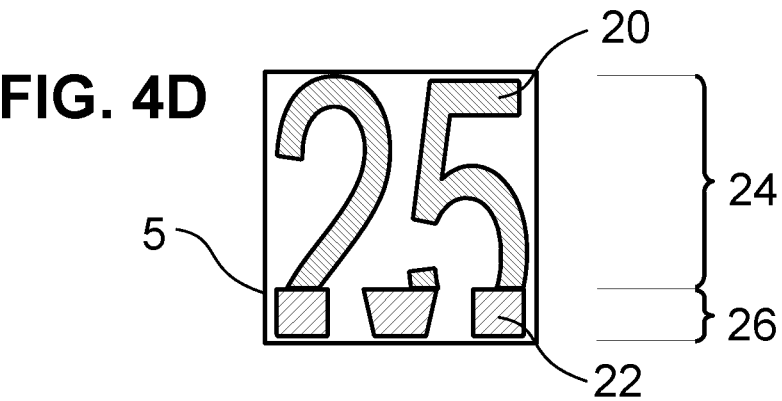
Figure 4E:
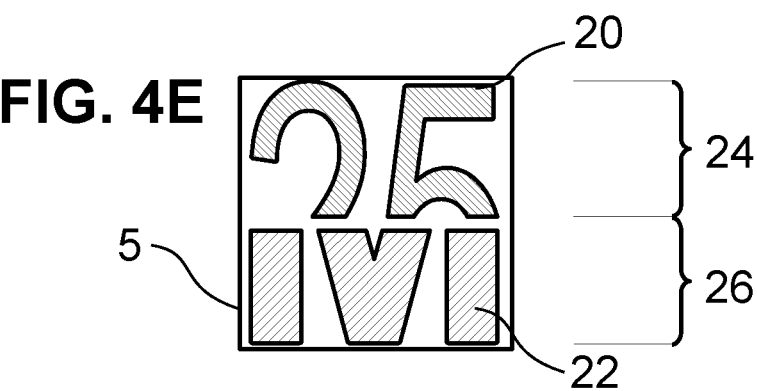
Figure 4F:
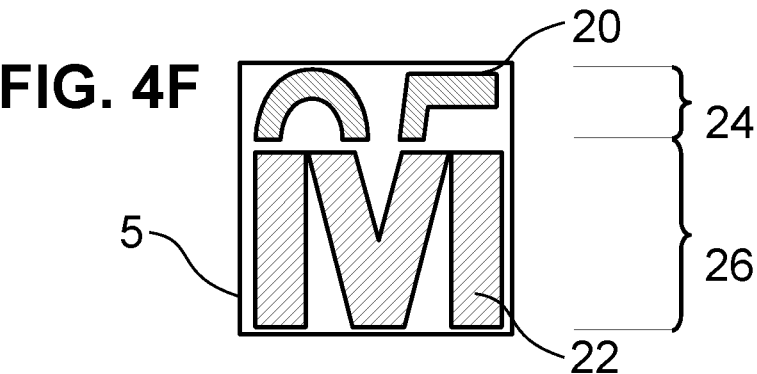

In FIGS. 4C, 4E and 4F, a "neutral zone" is situated between the portion 24, in which the remains of the first motif 20 are visible, and the portion 26, which contains the remains of the second motif 22 (with different size proportions depending on the tilt position 11), with none of the two motifs to be seen in said "neutral zone". This neutral zone is formed by an edge strip 28 of the rest 26 in which the first motif is no longer visible (since the rest 26 is not part of the portion 24 of the areal region 5), but the second motif 22 is not recognizable either. This promotes the recognizability of the transition. However, it is equally possible, as shown in FIG. 4D as a modification to the embodiment according to FIG. 4C, not to provide an edge strip 28, so that the sections of the first motif 20 in the portion 24 directly border on the corresponding sections of the second motif 22 in the rest 26 of the areal region 5.

Figure 5:
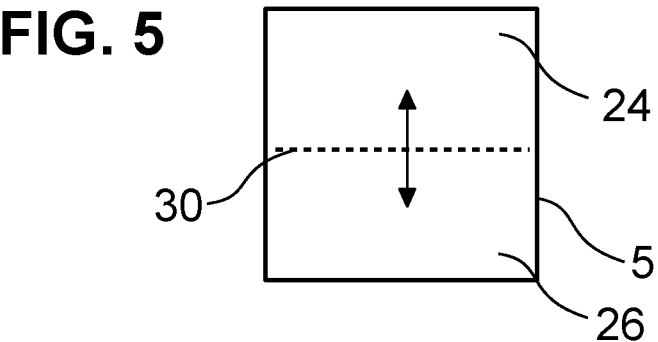
Figure 6:
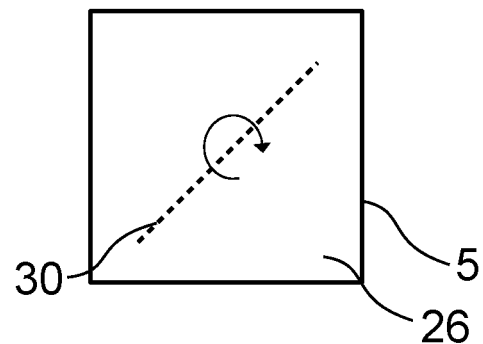
Figure 7:
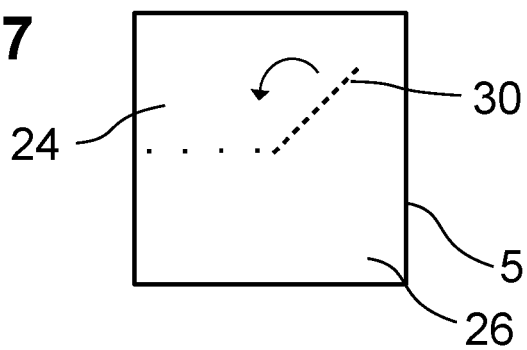
Figure 8:
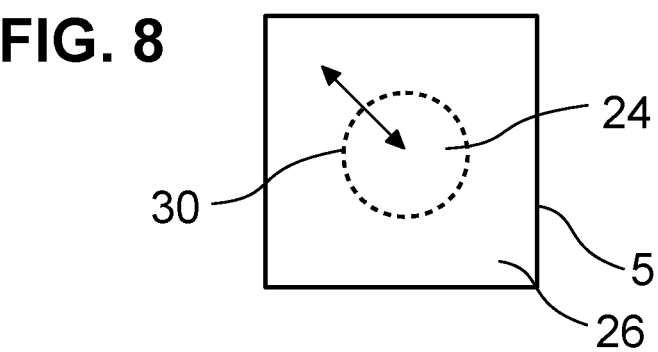

The transition between the first motif 20 and the second motif 22 upon tilting takes place through the tilting angle range in the embodiment of FIGS. 4A-4F along a straight line that moves, for example, parallel to the tilting axis 6 (oblique positions of up to 90° are possible). In other words, a boundary 30 between the portion 24 of the area 5 in which the first motif 20 is visible and the rest 26 of the area 5 in which the second motif 22 appears has the shape of a straight line which likewise moves linearly. This principle is illustrated again in FIG. 5. FIG. 6 shows that the embodiments are not limited thereto. Here, the linear boundary 30 does not move along a straight line but rotates. FIG. 7 shows a further modification, in which the boundary 30 starting from a basic position drawn in dotted manner in the form of a minute hand rotates counterclockwise or clockwise when the switch takes place. FIG. 8 shows that the boundary 30 does not necessarily have straight lines, but also has the shape of a closed trajectory, here a circle, so that the portion 24 is, for example, situated inside the circle and the rest 26 is the outer region outside the circle line.

Of course, the embodiments are not limited to two motifs; this has been chosen in the described figures merely for the sake of improved recognizability. There are also three, four or more motifs possible, which switch in the described manner when the security element is tilted.

In addition to an optical enhancement of the motif switch, the embodiments also offer additional protection against forgery, since not only two different motifs are either visible or not visible, but also many intermediate views of the transition while the boundary 30 changes. This is difficult or impossible to forge.

A further augmentation of the protection against forgery is achieved when the motifs 20, 22 have different colors, which is indicated in FIGS. 4A-4F by different hatchings. The protection against forgery is heightened here, since not only are two separate motifs with exact color registration visible, but the color registration also has a predetermined course in all intermediate views, i.e. while the boundary 30 is changing, would thus have to be imitated by a forger. In addition, the dynamic color switch implemented by changing the position of the boundary 30 with a transition contour that can be configured in almost any manner, i.e. the shape of the boundary 30, is significantly more striking and impressive than with a purely binary switch between two colors.

The invention claimed is:

1. A security element for manufacturing value documents, comprising:
   a structure presenting a first and a second motif, which change their appearance when the security element is tilted over a tilting angle range,
   wherein the structure has first micro-elements, which are arranged according to a first pattern and present the first motif, and second micro-elements, which are arranged according to a second pattern and present the second motif, and
   wherein the first and the second pattern are nested within each other on an areal region of the security element,
   wherein the first micro-elements present the first motif in such a manner that the first motif is visible in its entirety in the areal region within the tilting angle range at a certain start tilt position and, when the tilt position changes, is still visible only in a portion of the areal region which decreases as the tilt increases and, upon reaching a certain end tilt position, is no longer visible at all, and
   wherein the second micro-elements present the second motif only in the rest of the areal region remaining in relation to the portion of the areal region,
   wherein the second motif is not visible at all in the areal region at the start tilt position and is visible in its entirety in the areal region at the end tilt position,
   wherein the first and second micro-elements have micromirrors,
   wherein the micromirrors are arranged and a gradient of the micromirrors is configured such that spatial subregions of the first and second motifs each have different viewing angle ranges.

2. The security element according to claim 1, wherein the first micro-elements present the first motif such that upon tilting only the section of the first motif that is assigned to the portion of the areal region is visible, and that the second micro-elements present the second motif such that upon tilting only the section of the second motif assigned to the rest of the areal region is visible.

3. The security element according to claim 1, wherein the first and the second micro-elements present the motifs such that upon tilting, neither one of the two motifs is visible in an edge strip of the rest of the areal region that borders on the portion of the areal region.

4. The security element according to claim 1, wherein the two motifs have different colors.

5. The security element according to claim 1, wherein a boundary between the portion and the rest of the areal region is a straight line that moves as the tilt increases.

6. The security element according to claim 1, wherein a boundary between the portion and the rest of the areal region is a closed curve, in particular a circle, which becomes larger as the tilt increases.

7. The security element according to claim 1, wherein the micromirrors of the first and/or the second micro-elements are supplied with an ink coating that produces a color impression,
 wherein the ink coatings of the micromirrors are in particular formed by glazing inks, by metallizations, by thin-film structures, by glazing inks backed with a metallization, by luminescent inks with a metallic mirror coating, by structural inks and/or by nanoparticle inks.

8. A value document with a security element according to claim 1.

9. A method for manufacturing a security element for value, wherein the method comprises the steps of:
 producing a structure on a substrate presenting a first and a second motif which change their appearance when the security element is tilted over a tilting angle range, wherein
 the structure has first micro-elements, which are arranged according to a first pattern and present the first motif, and second micro-elements, which are arranged according to a second pattern and present the second motif, and
 the first and the second pattern are nested within each other on an areal section of the security element,
 wherein the first micro-elements present the first motif in such a manner that the first motif is visible in its entirety in the areal region within the tilting angle range at a certain start tilt position and, when the tilt position changes, is still visible only in a portion of the areal region which decreases as the tilt increases and, upon reaching a certain end tilt position, is no longer visible at all, and
 the second micro-elements present the second motif only in the rest of the areal region remaining in relation to the portion of the areal region,
 wherein the second motif is not visible at all in the areal region at the start tilt position and is visible in its entirety in the areal region at the end tilt position,
 wherein the first and second micro-elements have micromirrors,
 wherein the micromirrors are arranged and a gradient of the micromirrors is configured such that spatial subregions of the first and second motifs each have different viewing angle ranges.

10. The method according to claim 9, wherein a security element is manufactured.

* * * * *